Dec. 3, 1940.　　　　D. G. RENNO　　　　2,223,577

VEHICLE BODY

Filed June 23, 1939　　　　2 Sheets-Sheet 1

Inventor
Donald G. Renno

Dec. 3, 1940. D. G. RENNO 2,223,577
VEHICLE BODY
Filed June 23, 1939 2 Sheets-Sheet 2
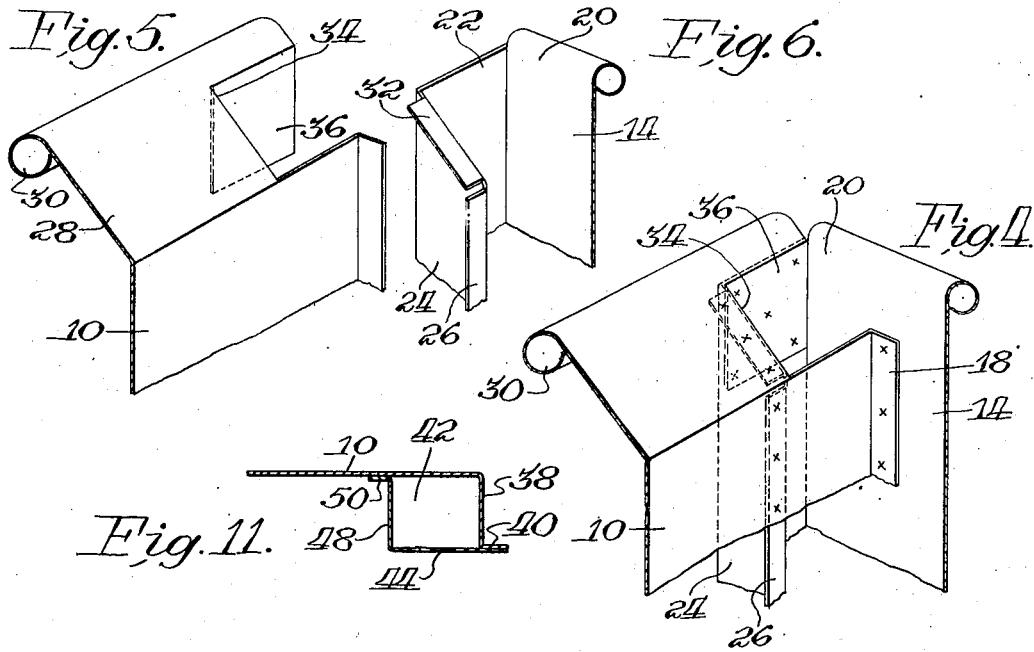
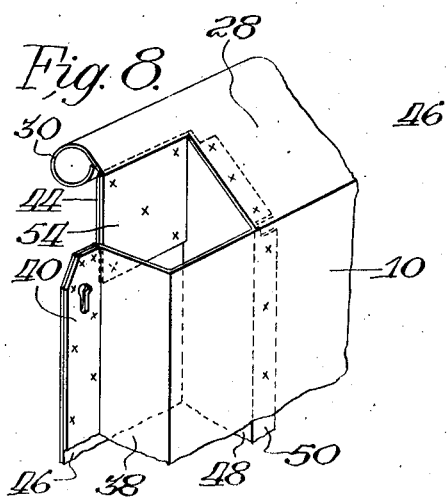
Inventor
Donald G. Renno
By Rane O. Pippel
Atty.

Patented Dec. 3, 1940

2,223,577

UNITED STATES PATENT OFFICE 2,223,577

VEHICLE BODY

Donald G. Renno, Fort Wayne, Ind., assignor to International Harvester Company, a corporation of New Jersey Application June 23, 1939, Serial No. 280,738

6 Claims. (Cl. 296—30)

This invention relates to a vehicle body and more particularly to a sheet metal body construction in which rigid corner posts are provided at the corners thereof, being formed from integral portions of the body walls or panels. Applicant's copending application, Serial No. 342,429, filed June 26, 1940, divided out from the present application, pertains to other features of the body construction, particularly the rear parts thereof.

The invention contemplates and has for its principal object the provision of a light-weight sheet metal body construction in which adjacent walls are joined to form corner posts from extending portions rigidly carried by the walls.

An important object is to provide extending portions at the junction of two walls, which portions are bent in a manner forming box-like corner constructions and which have integral flanges thereon which may be readily secured to an adjacent wall portion.

Another object is to provide for the forming of a corner post which may serve as a stake pocket at the junction of adjacent walls, wherein one wall has an upwardly and outwardly extending wing portion formed with an opening coincident with the stake pocket.

Another object is to produce a less expensive, light, strong, and usable body better adapted to modern production facilities, such as welding and assembling equipment.

Another object is to obtain rigid, box-like or tubular construction at the corners of the body with fewer components and with a greater strength utilization of material consumed. Incidental to this is the facilitated manufacture and lower cost through reduction in number of parts, assembling and handling operations.

Another object is to provide a rectangular or tubular corner post construction adaptable to use as stake pockets if this feature is desired.

The basic purpose and accomplishment of the front corner construction is to so shape the end and side panels that they are mutually reenforcing when combined, providing a rigid box-corner and eliminating the extra pillars commonly used.

And still another object is to provide an extending portion on the wing portion which is secured to an extending portion of one of the wall portions forming the stake pocket.

Briefly and specifically, these and other important objects are achieved in one preferred embodiment of the invention by the provision of two body wall portions which are joined together to form a corner in the body, at least one of the walls having an integral portion thereof extending beyond the junction and being bent back and toward the other wall and secured thereto to form a rigid, reenforcing corner post structure, the wall portions being provided with flanges which may be conveniently secured to abutting wall portions.

A more complete understanding of the objects and desirable features of the invention may be had from the accompanying sheets of drawings, in which:

Figure 4 is an enlarged perspective view of the junction between the side wall or panel and the front wall, showing the manner in which the corner post and stake pocket is formed thereat;

Figures 5 and 6 are perspective views of portions of a side wall and an end wall, respectively, as arranged before being secured together;

Figure 7 is a diagrammatic view taken on the line 7—7 of Figure 1, showing generally the manner of forming a front corner post and stake pocket;

Figure 8 is a perspective view of a rear end portion of the body, showing a corner post and stake pocket formed thereat;

Figures 9 and 10 are perspective views of a wall portion or piece and a side wall, respectively, illustrating the same as disposed before being secured together to form a rear end stake pocket; and, Figure 11 is a diagrammatic view taken on the line 11—11 of Figure 1 and illustrating the manner of forming a rear end stake pocket.

Figure 1:
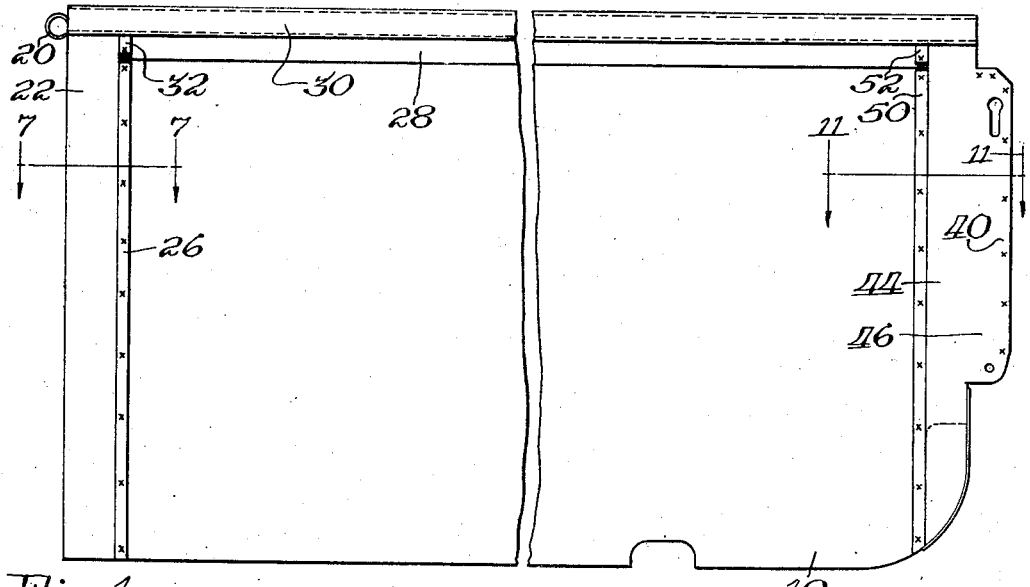
Figure 1 is a side elevational view of a side wall or panel of a vehicle body.
Figure 2:
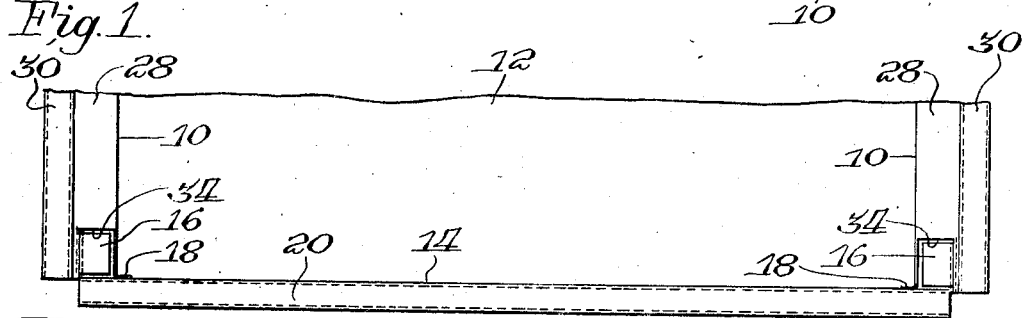
Figure 2 is a plan view of a portion of the front end of the body showing the relation between the side walls and an end wall and the manner in which corner posts are formed at opposite corners.
Figure 3:
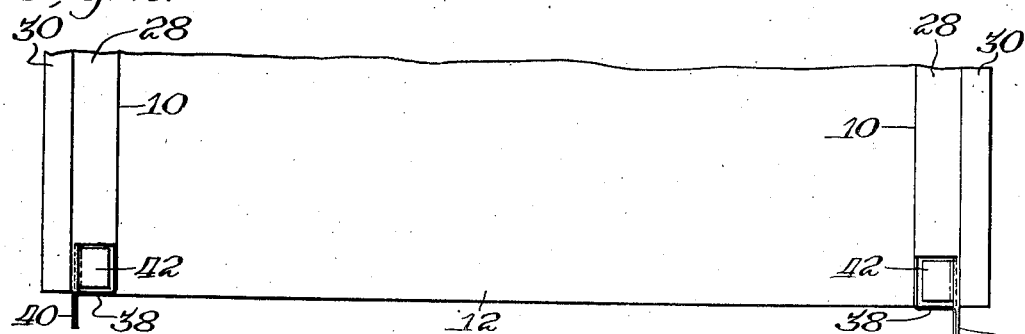
Figure 3 is a similar plan view showing a rear portion of the body and the corner posts and stake pockets formed at the corners thereof.

The particular vehicle body chosen for purposes of illustration herein is of the sheet metal type comprising a pair of vertical side walls 10, a floor 12, and a vertical transverse front end wall 14. The rear wall of the body is in the form of a movable end gate, not shown. The side walls or panels 10 and the front wall 14 are joined together to form two front corner post structures, according to the present invention, which additionally provide stake pockets 16, respectively, at the corners. The structure forming each front corner post and stake pocket is best shown in Figures 4 to 7.

The side wall 10 is formed with an integral flange 18, bent preferably at right angles to the general plane of the side wall, which flange is secured, preferably by welding, to the vertical inner face of the front wall 14 adjacent one end thereof to form one of the front corners. An end portion or extension 20 of the front wall 14 extends outwardly beyond the junction formed at the flange 18, and includes a further extension 22, preferably formed integrally therewith, which extends rearwardly and parallel to the side wall 10. The portion 22 has further formed integrally therewith another extension or portion 24, which extends preferably parallel to the front wall 14 and at right angles to the side wall 10, being formed with a securing flange 26 which is preferably welded to the outer face of the side wall 10. As best shown in Figure 7, the extensions or wall portions 20, 22, and 24 form, with a portion of the side wall 10, a tubular or rectangular box section comprising one of the corner post structures 16.

The side wall 10 includes rigidly thereon an upper wing portion 28 which extends upwardly and outwardly therefrom and which is disposed longitudinally of the side wall from the front end to the rear end of the body. This portion is formed with a rolled or reenforced edge 30. The extension or wall portion 24 formed on the front wall 14 has an upwardly and outwardly inclined flange 32 conforming to the inclination of the wing portion 28. The wing portion is cut out to form an opening 34, which is coincident with the area of the stake pocket 16 formed in the corner post structure when the side wall or panel and the end wall are secured together. The inclined flange 32 is secured to the wing portion 28. The portion or section of the wing portion 28, which is cut out to form the opening 34, is bent down, as at 36, and extends vertically at the inner face of the extension or portion 22 formed on the front wall 14. This section 36 is rigidly secured to the portion or extension 22 to further reenforce the box section formed by the junction of the walls 10 and 14 in forming the corner post 16. It will be understood, of course, that the corner post at the other corner of the front end of the body is similarly formed.

The structure forming the rear end corner post structures is best shown in Figures 8 to 11. The rear end of a side wall or panel 10 is formed with an offset extension or wall portion 38 extending preferably at right angles to the general plane of the side wall. This portion 38 is further formed with a rearwardly extending extension or portion 40 disposed generally parallel to the side panel 10. The formation of the side wall structure at this rear corner provides an offset portion adapted to receive an end gate, not shown.

A corner post 42 is formed at the rear corner by the provision of an additional wall section or portion 44, which includes a vertically extending section 46 disposed parallel to the plane of the side wall 10 and secured along a rearward edge thereof to the rearwardly extending portion 40 formed at the offset portion at the rear of the side wall. The section 46 further includes an integrally formed inwardly extending portion 48 disposed preferably at a right angle to the plane of the side wall 10 and having formed thereon an integral attaching flange 50, preferably welded to the outer face of the side wall 10. It will be seen, from an examination of Figure 11, that the rearward extending portion of the side wall 10 forms, with the offset portion 38 and the two sections 46 and 48 of the member or section 44, the corner post 42 at the rear end corner of the body.

As previously mentioned, the side wing portion 28 extends longitudinally of the side wall 10. This wing portion is cut out at its rearward end to provide an opening 50, which is coincident with the stake pocket formed by a corner post structure 42 formed at the rear corner of the body. The portion 48 of the wall member 44 has an upwardly and outwardly inclined flange 52, which conforms to the inclination of the side wing portion 28 and which is rigidly secured to the under side thereof. The portion or section of the rearward end of the wing portion 28 which is cut out to form the opening 50, is bent downwardly, as at 54, to form a section which is rigidly secured to the wall portion 46 of the wall member 44. The construction in this respect is identical to the forward corner post construction 16. It will be understood, of course, that the forward corner construction could be exactly duplicated at the rear end of the body, if no provision for an end gate is to be made, and in this sense the members or portions 44 may be termed wall portions or sections.

From the foregoing description it will be seen that an improved body construction has been provided, the construction of which attains the aforesaid objects and includes other desirable features which will be readily apparent to those skilled in the art. It will be understood that only a preferred embodiment of the invention has been illustrated and described, and it will be apparent that numerous modifications and alterations may be made therein without departing from the spirit and scope of the invention as defined in the appended claims.

What is claimed is:

1. In a vehicle body construction, a vertical sheet metal first wall and a vertical sheet metal second wall, said second wall being rigidly secured at one end to the first wall, said first wall having a portion projecting beyond its junction with the second wall, an extension connected to said portion and directed substantially in the direction of the second wall, and a further extension connected to said extension and directed at an angle to the first extension substantially toward the second wall, said further extension being secured to the second wall and forming substantially a box at the junction of the walls, said second wall being formed with a portion extending in the direction of the first wall projecting portion, said second wall portion being formed with an opening substantially coincident with the cross-sectional area of the aforesaid box.

2. In a vehicle body construction, a pair of sheet metal walls secured together to form two walls of the body, one of the walls including an integral portion thereon extended past the junction of the walls and bent back toward and rigidly secured to the other wall to form substantially a box at the junction of the walls, one of said walls further including an integral wing disposed in a plane at an angle to the plane of that wall and directed in the direction of the aforesaid portion, said wing having an opening thereon substantially coincident with the box.

3. In a vehicle body construction, a pair of sheet metal walls secured together to form two sides of the body, one of the walls including an integral portion thereon extended past the junction of the walls and bent back toward and rigidly secured to the other wall to form substantially a box at the junction of the walls, one of said walls further including an integral wing disposed in a plane at an angle to the planes of the walls and directed in the direction of the aforesaid portion, said wing having an opening thereon substantially coincident with the box, said wing having an integral section thereof adjacent the opening secured to the aforesaid extended portion.

4. In a vehicle body construction, a vertical sheet metal wall and a vertical panel, said panel being formed with an inturned flange rigidly secured to the wall, said wall projecting beyond the junction with the panel, an extension being formed at right angles from said projecting end, and a further extension connected to said extension and extending inwardly substantially parallel to the wall, said further extension being secured to the panel, said panel being formed with an upper portion extending at an angle upwardly and outwardly, said portion being formed with an opening corresponding to the cross section of the area formed by the extensions of the wall, said opening being formed by a bent-down portion of the angled panel portion, said bent-down portion being secured to the extension on the end wall.

5. In a vehicle body construction, a vertical sheet metal end wall and vertical sheet metal side panels, said side panels being formed with inturned flanges rigidly secured to the end wall, each end of said end wall projecting laterally beyond the corresponding side wall, a first extension being formed at right angles from each end of the end wall and a second extension connected to the first extension and directed inwardly parallel to the end wall, said second extension being formed with a flange rigidly secured to the side panel, said extensions forming a vertical stake pocket, each of the side panels being formed with an upper portion extending at an angle upwardly and outwardly, said portion being formed with an opening corresponding to the cross-section of the pocket formed by the extensions of the end wall.

6. In a vehicle body construction, a vertical sheet metal end wall and vertical sheet metal side panels, said side panels being formed with inturned flanges rigidly secured to the end wall, each end of said end wall projecting laterally beyond the corresponding side wall, a first extension being formed at right angles from each end of the end wall and a second extension connected to the first extension and directed inwardly parallel to the end wall, said second extension being formed with a flange rigidly secured to the side panel, said extensions forming a vertical stake pocket, each of the side panels being formed with an upper portion extending at an angle upwardly and outwardly, said portion being formed with an opening corresponding to the cross-section of the pocket formed by the extensions of the end wall, said opening being formed by a bent-down portion of the angled panel portion, said bent-down portion being secured to the extension on the end wall.

DONALD G. RENNO.